(12) United States Patent
Severance et al.

(10) Patent No.: US 10,318,536 B2
(45) Date of Patent: *Jun. 11, 2019

(54) GENERATING A SEARCH RESULT RANKING FUNCTION

(71) Applicant: PayPal, Inc., San Jose, CA (US)

(72) Inventors: Stephen Severance, San Francisco, CA (US); Paul Wheeler, San Francisco, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/221,041

(22) Filed: Jul. 27, 2016

(65) Prior Publication Data
US 2016/0335269 A1 Nov. 17, 2016

Related U.S. Application Data

(63) Continuation of application No. 12/874,956, filed on Sep. 2, 2010, now Pat. No. 9,405,835.

(51) Int. Cl.
*G06F 17/30* (2006.01)
*G06F 16/2457* (2019.01)
*G06F 16/248* (2019.01)
*G06F 16/951* (2019.01)
*G06F 16/9535* (2019.01)
*G06Q 30/06* (2012.01)

(52) U.S. Cl.
CPC ...... *G06F 16/24578* (2019.01); *G06F 16/248* (2019.01); *G06F 16/951* (2019.01); *G06F 16/9535* (2019.01); *G06Q 30/0625* (2013.01)

(58) Field of Classification Search
None
See application file for complete search history.

*Primary Examiner* — Alex Gofman
(74) *Attorney, Agent, or Firm* — Maschoff Brennan (57) ABSTRACT

A method and a system to provide generate a search result ranking function, processing a search, and presenting search results are described to provide generate a search result ranking function, processing a search, and presenting search results are described. In one embodiment, a genetic algorithm module receives a plurality of factors, a test set of items, and an ordering solution representing the preferred ordering of the test set of items, generates a potential ranking function based on the plurality of factors, and apply the potential ranking function to each item in the test set of items to generate an ordering of items associated with the potential ranking function. The genetic algorithm module also compares the ordering of items with the ordering solution, and identifies, based on the comparison, the potential ranking function as a solution ranking function. A ranking function may assign a ranking score to items in a set of active items, the ranking score based on the solution ranking function.

19 Claims, 8 Drawing Sheets

| Item ID | Publish Date | End Date | Listing Quality | Views | Watches | Bids | End Price | Initial Price | Revenue | Seller Score | Category |
|---|---|---|---|---|---|---|---|---|---|---|---|
| 3281 | 01/10/2001 | 01/17/2001 | 5 | 223 | 22 | 6 | $64.50 | $50.00 | $5.00 | 8.5 | Electronics |
| 78754 | 02/15/2005 | 03/01/2005 | 4 | 3421 | 93 | 13 | $13.00 | $5.00 | $.75 | 7.2 | Books |
| 54337 | 10/31/2003 | 11/05/2003 | 2 | 96 | 6 | 7 | $645.00 | $499.99 | $10.37 | 6.9 | Art |
| 94641 | 09/08/2003 | 01/08/2004 | 5 | 10573 | 512 | 23 | $97.50 | $32.99 | $5.00 | 9.4 | Apparel |
| 45150 | 06/01/2009 | 7/1/2009 | 3 | 1237 | 98 | 8 | $172.33 | $110.00 | $5.97 | 8.6 | Collectibles |
| ... | | | | | | | | | | | |

GENERATING A SEARCH RESULT RANKING FUNCTION

CROSS-REFERENCE TO RELATED APPLICATION

This application is a Continuation of U.S. patent application Ser. No. 12/874,956 filed on Sep. 2, 2010, the contents of which are incorporated herein by reference in their entirety.

TECHNICAL FIELD

The present application relates generally to the technical field of use of data processing techniques. More specifically, the present application relates to ordering or ranking a number of items and, in one specific embodiment, to order a number of search result items.

BACKGROUND

Advancements in computer and networking technologies have enabled persons to conduct commercial and financial transactions "on-line" via computer-based applications. This has given rise to a new era of electronic commerce (often referred to as e-commerce.) A number of well-known retailers have expanded their presence and reach by operating websites that facilitate e-commerce. In addition, many new retailers, which operate exclusively online, have come into existence. The business models utilized by enterprises operating online are almost as varied as the products and services offered. For instance, some products and services are offered at fixed prices, while others are offered via various auction methods, and still others are offered via a system of classified ad listings. Some enterprises specialize in the selling of a specific type of product (e.g., books) or a specific service (e.g., tax preparation), while others provide a myriad of categories of items and services from which to choose. Some enterprises serve only as an intermediary, connecting sellers and buyers, while others sell directly to consumers.

Despite the many technical advances that have improved the state of e-commerce, a great number of technical challenges and problems remain. One such problem involves determining how to best present products and services (e.g., items) that are being offered for sale, so as to maximize the likelihood that a transaction (e.g., the sale of a product or service) will occur. For instance, when a potential buyer performs a search for a product or service, it may often be the case that the number of items that satisfy the potential buyer's query far exceeds the number of items that can practically be presented on a search results page. Furthermore, it is well established that the presentation of an item in a search results page—for example, the order or placement of the item in a list of listings, the font, font size, or color of the listing, and so on—can affect whether potential buyers select the listing, and ultimately purchase the listed product or service.

There may be many competing interests in determining how to best present items to a customer. For enterprises that serve as an intermediary—for example, by connecting buyers with sellers—it is generally desirable that the presentation of items occur in a manner that strikes a balance between the needs and desires of the various sellers, the buyers or potential buyers, and the enterprise itself. If the interests of sellers and buyers are not adequately satisfied, they may not use the enterprise, which will ultimately negatively affect the e-commerce enterprise. Similarly, the enterprise will be negatively affected if the enterprise's interests are not adequately satisfied.

BRIEF DESCRIPTION OF THE DRAWINGS

Some embodiments are illustrated by way of example and not limitation in the figures of the accompanying drawings in which.

DETAILED DESCRIPTION

Example methods and systems to provide generate a search result ranking function, processing a search, and presenting search results are described. In the following description, for purposes of explanation, numerous specific details are set forth in order to provide a thorough understanding of example embodiments. It will be evident, however, to one skilled in the art that the present invention may be practiced without these specific details.

A genetic algorithm is a technique used to compute a solution to a problem. It involves generating a number of possible solutions and evaluating the fitness or performance of each of the possible solutions. Certain possible solutions are selected based on their performance and may be modified to form a new set of possible solutions. This process typically repeats for a certain number of cycles, for a certain amount of time, or until satisfactory results are obtained.

Genetic algorithms may be used to solve a multitude of problems. For example, a genetic algorithm may be used to determine whether the price of a stock will go up given a set of factors. A data set containing information on a variety of factors and stock prices over a certain period of time may be fed into a genetic algorithm module. The genetic algorithm module may generate multiple possible solutions or formulas that take all or a subset of the factors and attempt to predict stock prices based on the factors used. These formulas may be generated randomly or based on a predetermined pattern. Once generated, the possible solutions or formulas are applied to a data set comprising various factors and values associated with the factors and the results of the application of the possible solutions are compared to the actual results. The fitness of each possible solution or formula is determined based on how closely the predicted result of the possible solution matches the actual result in the data set. One or more possible solutions may be selected based on their respective fitness to enter the next cycle (or generation) of the genetic algorithm. These possible solutions may be modified, recombined, mutated, or left alone in the subsequent cycles and may be joined by newly generated possible solutions in subsequent cycles. At the end of the process, the genetic algorithm module may output one or more possible solutions that match or closely approximate the results of the data set. However, genetic algorithms and genetic algorithm modules generally require a large amount of computing resources. Furthermore, the complexity of the problem or the number of factors that need to be considered in solving a problem may require increase the amount of computing power to needed to implement genetic algorithms.

In the context of an electronic commerce platform, such as a retail website, auction website, classifieds website, fixed-price transaction website, or other on-line trading platform, users may be able to search for items, such as item listings or advertisements, on the on-line trading platform. Generally this involves a user submitting a query with query terms and the on-line trading platform executing the query and displaying a number of items to a user in a search results page. Generally, items presented at or near the top receive the most attention from users, as a result, some on-line trading platforms attempt to order or rank the items in a search results page in a way that maximizes purchases or profits. For example, the items in the search results page may be ordered or ranked according to a ranking score for each item listing. In particular, the position of the items may be determined by analyzing factors or item attributes of each item listing and assigning a ranking score based on the analysis. For example, items may be given a ranking score according to a ranking function that factors in the number of times an item listing was viewed, the date the item listing was published, the listing quality, the number of times an item listing was bid on if the item listing is an auction item listing, the number of times an item listing is tracked or watched by a user, etc. Ranking functions are often generated manually or based on a limited number of factors.

In one embodiment, an on-line trading platform may use a genetic algorithm to automatically generate a ranking function that may assign a ranking score to each item and order or rank the items in the search results. For example, a data set containing information about a number of item listing factors and attributes may be used to generate multiple possible ranking formulas. These multiple possible ranking formulas may be applied to a list of items to generate an ordered list of items associated with each possible ranking formula. The generated ordered lists associated with each possible ranking formula are then compared with a solution ordered list representing the preferred ordering of the items in order to evaluate the fitness and performance of each possible ranking formula. This solution ordered list may be provided by a system administrator or automatically calculated. One or more possible ranking formulas may be selected based on its fitness to enter the next cycle or generation of the genetic algorithm. These possible ranking formulas may be modified, recombined, mutated, or left alone in the subsequent cycles and may be joined by newly generated possible ranking formulas. At the end of the process, the genetic algorithm module may output one or more possible ranking formulas order the items in a way that matches or closely approximates the solution ordered list.

Figure 1:
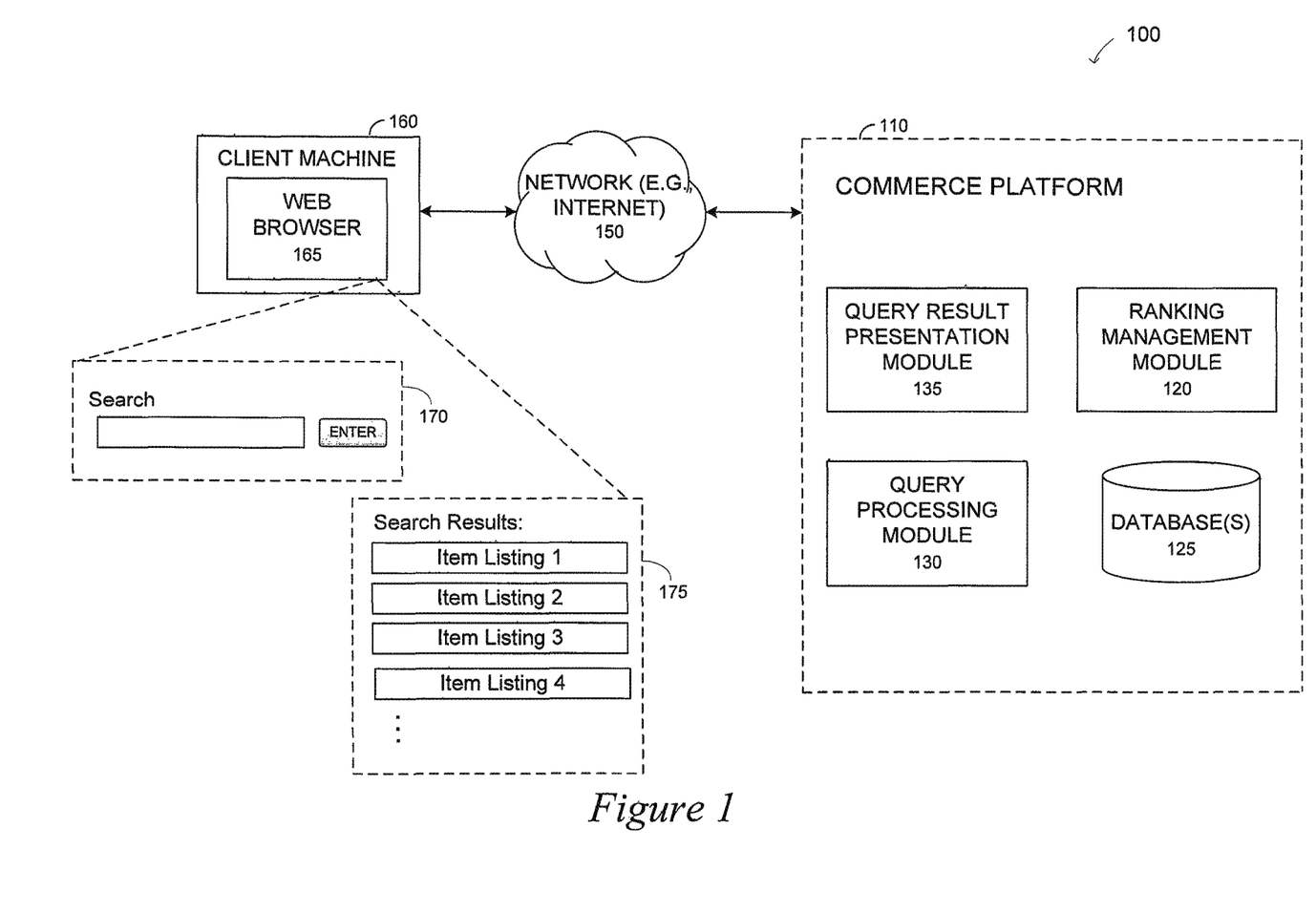
FIG. 1 is a block diagram illustrating a network environment within which an example genetic algorithm module may be implemented in accordance with one example embodiment.

FIG. 1 is a block diagram illustrating a network environment within which an example genetic algorithm module may be implemented in accordance with one example embodiment. The network environment 100 includes a commerce platform 110 and a client machine 160 connected via a network 150 (e.g., the Internet). As illustrated in FIG. 1, the commerce platform 110 may include a ranking management module 120, one or more databases 125, a query processing module 130, and a query result presentation module 135. The commerce platform may also consist of a variety of other subcomponents or modules not shown in FIG. 1 that provide other e-commerce functions.

As described more completely below, each module may be comprised of software instructions, computer hardware components, or a combination of both. To avoid obscuring the invention in unnecessary detail, only a few of the e-commerce functions are described herein. For example, the commerce platform 110 may include an item listing management module (not shown) that facilitates the receiving and storing of data representing item attributes (e.g., factors), which collectively form an item listing. When a user desires to list a single item, or multiple items, for sale, the user will provide information about the item(s) (e.g., item attributes). Such information may be submitted via one or more forms of one or more web pages, or via drop down lists, or similar user interface elements. The item listing management module receives the item attributes and stores the item attributes together within a database 125 as an item listing. In some instances, the item listings may be stored in an item listing database table. Other data representing item attributes or factors may be determined by other modules or components of the commerce platform 110 and stored in one or more databases 125.

As described in greater detail below, the item attributes or factors of each item listing may be analyzed to determine a ranking score assigned to item listings and used in determining the position of item listings when the item listings are being presented in a search results page. For example, the ranking management module 120, which is described more completely in connection with the description of FIG. 2, may be used to determine a ranking function based on the item attributes or factors and use the ranking function to assign a ranking score to one or more item listings. These ranking scores may be stored in a database 125 to be used later in processing a query and ranking the query results (e.g., a set of items that satisfy the query) when they are presented in a search results page.

For instance, in some embodiments, a user operates a web browser application 165 on a client system 160 to interact with an on-line trading application residing and executing on the commerce platform 110. As illustrated by the example user interface with reference number 170, a user may be presented with a search interface 170, with which the user can specify one or more search terms to be used in a search request submitted to the on-line trading application. In some embodiments, in addition to specifying search terms, users may be able to select certain item attributes, such as the desired color of an item, the item categories that are to be searched, and so on. After receiving the search request, a query processing module 130 may be used to process the query and obtain a search result. The query processing module 130 may use the ranking scores of each item listing in the search result to order or rank the item listings in the search result. After the search results are ordered or ranked, the query result presentation module 135 may generate an interface that may be used to display the ordered search result at the client machine 160. For example, the query result presentation module 135 may format placement of the item listing in a list or table of listings, the font, font size, or color of the listing, links to pictures, reviews, or other additional information, etc. The query result presentation module 135 may also provide additional functionalities to the interface that may be used to display the ordered search result.

After receiving and processing the search request, the on-line trading application may communicate a response based on the output of the query presentation module 135 to the web browser application 165 on the client system 160. For instance, the response is an Internet document or web page that, when rendered by the browser application 165, displays a search results page 175 showing several item listings that satisfy the user's search request. As illustrated in the example search results page 175 of FIG. 1, the item listings are arranged or positioned on the search results page in an order determined by ranking management module 120 and the query processing module 130 of the commerce platform 110. In other embodiments, instead of using a web browser 165, a user on the client machine 160 may interact with commerce platform 110 using another application running on the client machine 160.

Figure 2:
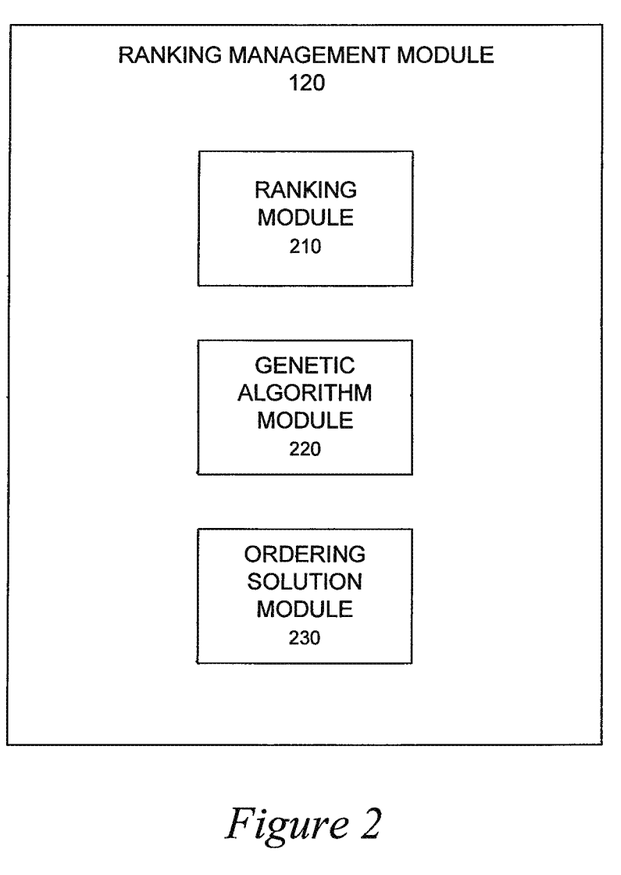
FIG. 2 is a block diagram illustrating a ranking management module in accordance with one example embodiment.

FIG. 2 is a block diagram illustrating a ranking management module 120 in accordance with one example embodiment. As illustrated in FIG. 2, the ranking management module 120 may comprise a ranking module 210, genetic algorithm module 220, and an ordering solution module 230. The genetic algorithm module 120 is used to generate a ranking function to be used to rank item listings. For example, the genetic algorithm module 220 may take a test set of items listings with a number of associated factors and an ordering solution representing the preferred ordering of the test set of item listings and use a genetic algorithm to generate a solution ranking function. This solution ranking function may later be used by the ranking module 210 to rank other items (e.g., item listings).

Figure 3:
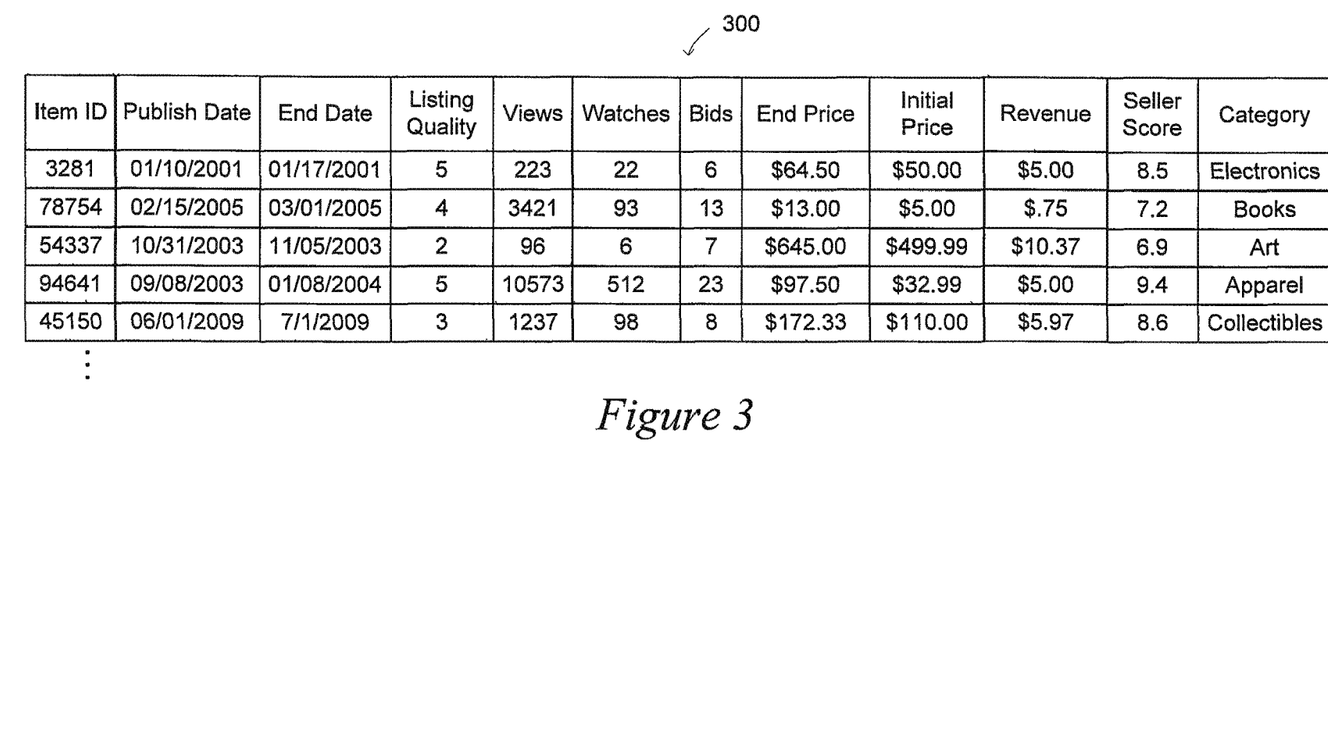
FIG. 3 is a block diagram illustrating a test set of items, in accordance with one example embodiment.

The test set of item listings may be a sample data set of item listings that has already been analyzed to determine an ordering solution associated with the sample data set. For example, FIG. 3 is a block diagram illustrating a test set of items 300, in accordance with one example embodiment. The top row of the test set of items 300 represents item attributes or factors that have been recorded for each item (e.g., item listing). For example, for each item (e.g., item listing), the commerce platform 110 may track data regarding the publish date of the item listing; an sale or auction end date for the item listing; a listing quality score, representing a measure of the likelihood that an item listing will result in a transaction based at least in part on historical data associated with similar item listings; the number of views received by the item listing; the number of people watching (e.g., tracking or monitoring) the item listing; the number of bids received by the item listing; the initial price the item was offered at, the price the item sold for (e.g., the end price); or revenue made by the enterprise based on the transaction.

Other data about the item listings (e.g., factors) may include the category or subcategory associated with an item; the shipping price of an item; the item's seller score, representing a measure of the seller's quality or reputation; a business rules score, representing a promotion or demotion factor determined based on the evaluation of one or more business rules. Any data recorded, monitored, or derived about an item or item listing may be used as a factor in the test set of item listings. For example, the item's seller score may be derived from the number of positive reviews of a seller, the number of negative reviews of a seller, the average number of days before shipment after payment is received, the average score (e.g., number of stars) given by a reviewer to a seller, etc. In one embodiment, the test set of item listings may be item listings that have completed (e.g., expired, auction ended, completed transactions, etc.) and, as a result, may have data associated with factors that may not be available for item listings that have not been completed. For example, in an on-line auction setting, a completed item listing may have information for factors such as end price or revenue made by the enterprise. However, item listings that are active, or not completed, may not have data for such factors; in other words, there may be factors that are not knowable for active item listings.

Returning to FIG. 2, as described in greater detail below, the ordering solution represents the preferred ordering of the test set of items. The ordering solution may be set by an administrator or the ordering solution module 230 may determine the ordering solution using a preferred ordering function. For example, the administrator may determine the ordering solution of the test set of items based on market research, surveys, empirical data, or some combination of those. In another embodiment, the ordering solution may be determined using a preferred ordering function that orders the test set of items based on the factors associated with the test set of items. For example, an administrator may set the preferred ordering function to rank the test set of items based on the revenue of the enterprise, the number of views or bids an item may receive, or a combination of factors.

The genetic algorithm module 220 may use a genetic algorithm or some other evolutionary algorithm to generate a solution ranking function. In one embodiment, the genetic algorithm module 220 may generate a number of different potential ranking functions based on one or more of the factors associated with the test set of items. The different potential ranking functions may act to take the data associated with various factors for an item or item listing and generate a ranking score for the item or item listing. Once several items (e.g., item listings) have been assigned ranking scores, the items may be ranked or ordered according to their respective ranking scores. In one embodiment, the potential ranking functions may be based only on factors that are knowable to active item listings.

In one embodiment, a potential ranking function may be the sum of the product of factors values and a weight associated with each factor. One example function is provided below for illustrative purposes:

$$\text{ranking score} = (\text{age of the listing})(\text{weight1}) + (\text{listing quality})(\text{weight2}) + (\text{seller score})(\text{weight3}) + \ldots$$

The example function provided uses at least the age of the item listing in days (age of the listing), listing quality, and seller score as factors. Associated with each factor is a weight. The potential ranking functions may be generated randomly or based on a predetermined formula or pattern. For example, the factors and weights used in the potential ranking functions may be randomly chosen.

Each of the potential ranking functions may be applied to each item listing in the test set of items to generate a ranking score for each item listing. In one embodiment, the item listings in the test set of items may be ranked or ordered based on their respective ranking scores. The order or ranking of the item listings in the test set of items that results from the application of each potential ranking function may be compared to the order or ranking of the item listings in the ordering solution and the performance of each potential ranking function is determined based on how closely the rankings that are the result of the potential ranking function compares to the rankings in the ordering solution.

One or more of the potential ranking functions may be selected based on their performance. In some embodiments, additional potential ranking functions may be created based on a selected potential ranking function. For example, a new potential ranking function may be generated based on a modified version of another potential ranking function (e.g., the new potential ranking function may have an incorporate an additional factor, remove a factor, alter the weight of a factor, etc.) Other potential ranking functions may be generated by combining portions of selected potential ranking functions (e.g., a combination of factor/weight pairs from several potential ranking functions). The modification or combination of potential ranking functions may be done at random or according to a predetermined formula or pattern.

These newly generated potential ranking functions may be used in the next iteration or cycle of the process (e.g., applied to the item listings in the test set of items, selected based on performance, used to generate new potential ranking functions, etc.). In one embodiment, the potential ranking functions selected from the previous iteration are used along with the newly generated potential ranking functions in the next iteration to make it more likely that the next "generation" of potential ranking functions will perform the same as, if not better than, the previous generation. In one embodiment, potential ranking functions are chosen that match or closely approximate the rankings of the ordering solution.

The process of generating potential ranking functions, applying them to the item listings in the test set of items, selecting potential ranking functions based on their performance, and modifying them may repeat for several cycles (e.g., iterations or generations). The process may stop when a certain number of cycles have been performed, when a certain amount of time has elapsed, when one or more potential ranking functions reach a certain level of performance, or when some other event has occurred. At the end of the process, the genetic algorithm module 220 may select one or more potential ranking functions as a solution ranking function that may be used to rank and order active item listings or search query results. Further details of the use of the solution ranking function in the context of ranking search query results are discussed with respect to FIG. 4.

Figure 4:
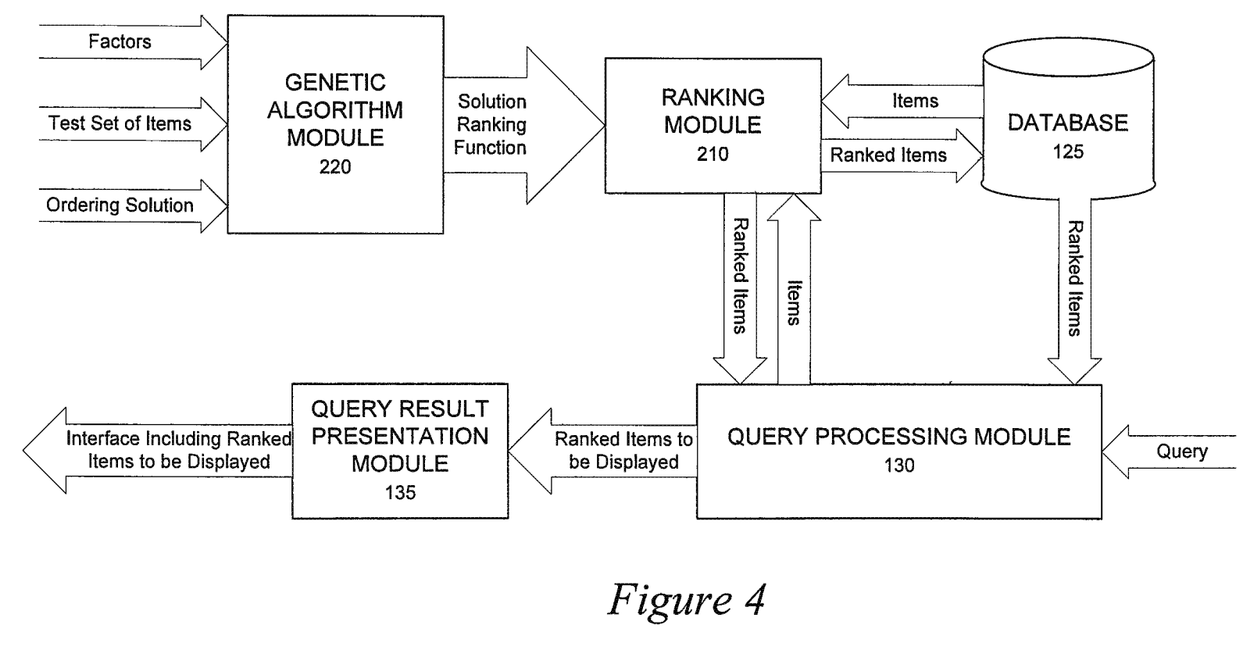
FIG. 4 is a data flow diagram illustrating the interaction between components in an example commerce platform in accordance with one example embodiment.

FIG. 4 is a data flow diagram illustrating the interaction between components in an example commerce platform in accordance with one example embodiment. As mentioned above, the genetic algorithm module 220 uses a test set of items, factors associated with the items, and an ordering solution representing the preferred ordering or ranking of the items in the test list of items and generates a solution ranking function. The ranking module 210 uses the solution ranking function to assign a ranking score to items (e.g., item listings). In various embodiments, the items may be received by the ranking module 210 from a database 125 storing items (e.g., item listings) or a query processing module 130 that has processed a query and presented the ranking module 210 with the query results to rank. After the ranking module assigns ranking scores to the items using the solution ranking function, the ranking scores may be stored in a database 125 or provided directly to the query processing module 130.

The query processing module 130 receives a query from a user and processes the query to generate a query result comprising items (e.g., item listings) stored in a database 125. If the items in the query result have already been assigned a ranking score, the query processing module 130 may be rank, order, or position the items in the query result based on their respective ranking scores. If the items in the query result have not been assigned a ranking score, the query processing module 130 may pass the items in the query result to the ranking module 210 to have them assigned ranking scores. Once the ranking module 210 has assigned ranking scores to the items in the query result, the query processing module 130 may order them and pass them to the query result presentation module 135. The query result presentation module 130 may do some additional positioning and formatting of the items in the query result and generate an interface to enable the query results to be displayed at a client machine 160.

Figure 5:
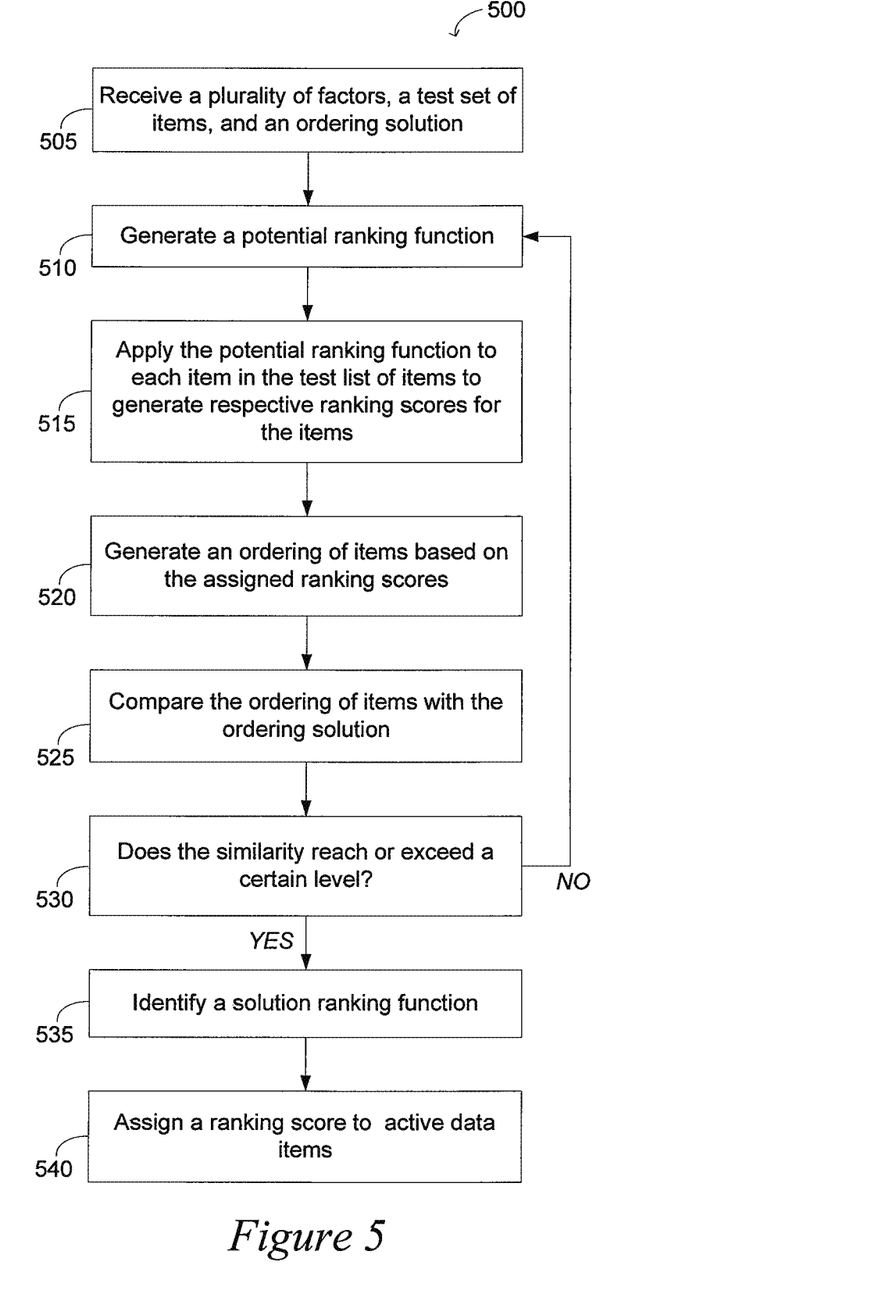
FIG. 5 is a flow diagram illustrating a method to generate a ranking function and assign a ranking score to items, according to various embodiments.

FIG. 5 is a flow diagram illustrating a method 500 to generate a ranking function and assign a ranking score to items, according to various embodiments. One or more of the operations of method 500 may be performed using a processor. The method 500 begins at operation 505, when a genetic algorithm module 140 receives a plurality of factors, a test set of items, and an ordering solution. In one embodiment, these three may be received as separate data items. However, in other embodiments, two or more of them may be received in a single data item. For example, the factors may be received as a list identifying factors to be used by the genetic algorithm module, the test set of items may be received as a spreadsheet or table comprising a field identifying items and other fields containing information associated with items, and the ordering solution may be received as another data set identifying items and their associated ordering. The factors, test set of items, and ordering solution may also be received as one data set comprising a field identifying items, other fields containing factors associated with the items, and a preferred ordering score for each item that may be used to determine the ordering solution.

At operation 510, the genetic algorithm module 140 generates a potential ranking function based on the plurality of factors. As previously described in an embodiment, this may involve generating more than one potential ranking function either randomly or in a predetermined fashion using one or more of the plurality of factors received by the genetic algorithm module 140. At operation 515, the genetic algorithm module 140 applies each potential ranking function generated to each item in the test set of items to generate respective ranking scores for each of the items. These ranking scores may be used to generate an ordering of items associated with the potential ranking function at operation 520.

The ordering of the items associated with each potential ranking function is compared with the ordering solution at operation 525 in order to evaluate the performance of the potential ranking functions. For example, a ordering of items associated with a first ranking function may match or more closely approximate the ordering solution than a second ranking function may match the ordering solution. In this example, the first ranking function performs better than the second ranking function because it more closely approximates the ordering found in the ordering solution.

If several potential ranking functions are generated, one or more of these potential ranking functions may be selected based on their performance. In one embodiment, the selected potential ranking functions may be included in a next generation of potential ranking functions to be evaluated. In another embodiment, the selected potential ranking functions may also be used to modify other selected potential ranking functions or generate new potential ranking functions. Some or all of the selected potential ranking functions, the modified potential ranking functions, and the newly generated potential ranking functions may be used in the next generation of potential ranking functions.

The process of selecting or generating potential ranking functions, applying them to the item listings in the test set of items, selecting potential ranking functions based on their performance, and modifying them may repeat for several cycles (e.g., iterations or generations) until a termination event is reached. For example, the termination event may be when a certain number of cycles have been performed, when a certain amount of time has elapsed, or when one or more potential ranking functions reach a certain level of performance. When the termination event is reached, a final potential ranking function will be selected out of the most recent generation's ranking functions based on its performance and identified as a solution ranking function.

In one embodiment the termination event may be when a potential ranking function reaches a certain level of performance determined by a similarity level to the ordering solution. For example, at operation 525, the ordering of items associated with each potential ranking function may be compared with the ordering solution. If the similarity between the potential ranking function and the ordering solution does not reach or exceed a certain level at decision box 530, one or more new potential ranking functions may be generated to be included in the next cycle of the process. These new potential ranking functions may be generated based on a selection of previously generated ranking functions. For example, the new potential ranking functions may be potential ranking functions used in previous cycles, a modification of potential ranking functions used in previous cycles (e.g., new factors, removed factors, different combinations of weights, etc.), a combination of potential ranking functions used in previous cycles, or completely new potential ranking functions.

If the similarity between the potential ranking function and the ordering solution reaches or exceeds a certain level at decision box 530, a potential ranking function is identified as the solution ranking function at operation 535. This solution ranking function may represent the best performing ranking function generated by the genetic algorithm module during this execution of the method 500. This solution ranking function is then used to assign a ranking score to items in a set of active items at operation 540.

As discussed previously, the ordering solution represents the preferred ordering of the test set of items and is used by the genetic algorithm module 220 in generating a solution ranking function. The preferred ordering of the test set of items may reflect the interest of the enterprise. For example, the preferred ordering of the test set of items may be determined based on maximizing enterprise revenue for each transaction. In another embodiment, the preferred ordering may reflect a balancing of the enterprise's interest, sellers' interests, and potential buyers' interests.

Figure 6:
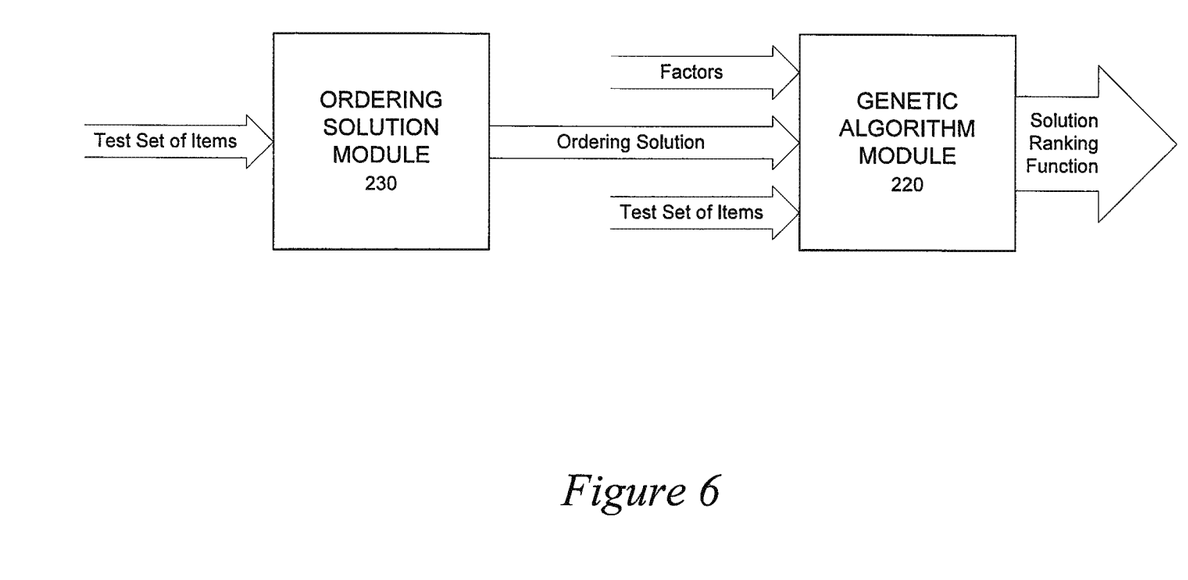
FIG. 6 is a data flow diagram illustrating the interaction between an ordering solution module and a genetic algorithm module, according to various embodiments.

The ordering solution may be set by an administrator or the ordering solution module 230 may automatically determine the ordering solution using a preferred ordering function. FIG. 6 is a data flow diagram illustrating the interaction between an ordering solution module 230 and a genetic algorithm module 220, according to various embodiments. The ordering solution module 230 receives a test set of items, uses a preferred ordering function to assign a preferred ordering score to each item in the test set of items, and determine an ordering solution for the test set of items based on the preferred ordering scores. One example preferred ordering function is provided below for illustrative purposes only:

preferred ordering score=(revenue of the enterprise)($w1$)+(# of bids)($w2$)+(# of views)($w3$)+(age of the listing)($w4$)+(listing quality)($w5$)+(seller score)($w6$) . . .

The example function provided uses at least revenue of the enterprise, the number of bids a listing item receives, the number of views a listing item receives, the age of the item listing in days (age of the listing), listing quality, and seller score as factors. Associated with each factor is a weight (e.g., $w1$-$w6$). In other embodiments, the preferred ordering function may be based on market research, surveys, empirical data, or some other measureable data associated with an item.

In one embodiment where the test set of items is comprised of completed item listings, the preferred ordering function may be based on any factors that may be used to generate a solution ranking function as well as factors that only available for completed item listings (e.g., not available for active item listings). For example, in an online auction setting where the revenue of the enterprise providing the auction platform is determined based on the final sale price, the revenue made by the enterprise cannot be determined until the item is finally sold (e.g., the item listing is completed). As a result, the revenue of an enterprise may be a factor used in the preferred ordering function to generate an ordering solution for the test set of completed items. However, a solution ranking function that will be used to assign ranking scores to active item listings may not be able to use the revenue of the enterprise as a factor because this information is not yet known for active item listings.

Once the ordering solution is determined by the ordering solution module 230, it is transmitted to the genetic algorithm module 220 where it may be used to generate a solution ranking function. A broad overview of the process, according to one embodiment, may be seen in FIG. 7.

Figure 7:
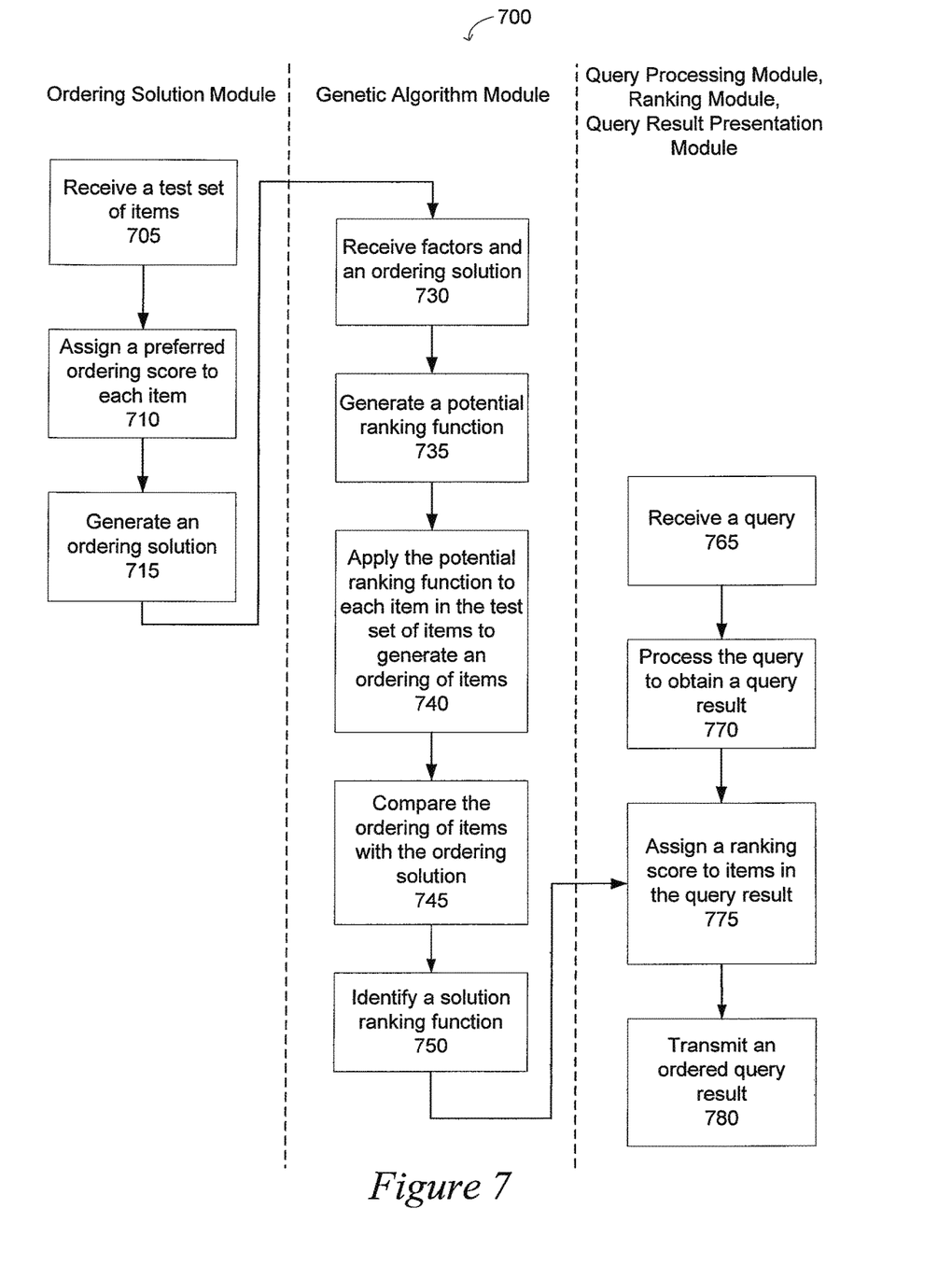
FIG. 7 is a flow diagram illustrating a method to process a query, according to various embodiments.

FIG. 7 is a flow diagram illustrating a method 700 to process a query, according to various embodiments. At operation 705, the ordering solution module 230 receives a test set of items and assigns a preferred ordering score to each item in the test set of items at operation 710. The assigning of the preferred ordering score may be done by an administrator or using a preferred ordering function as described above. At operation 715, the ordering solution module generates an ordering solution based on the preferred ordering scores of the items. This ordering solution may then be transmitted to the genetic algorithm module 220.

At operation 730, the genetic algorithm module 220 receives the ordering solution. The genetic algorithm module 220 may also receive factors and the test set of items as part of the ordering solution or in separate data transmissions. Using the test set of items and the factors, the genetic algorithm module 220 generates one or more potential ranking functions (operation 735) and applies the potential ranking functions to each item in the test set of items in order to generate an ordering of items associated with each potential ranking function (operation 740). Each of the ordering of items associated with a potential ranking function is compared with the ordering solution in order to determine or gauge the performance of the associated ranking function (operation 745).

In some embodiments, based on their performance, one or more of the potential ranking functions may be selected to join other generated potential ranking functions in the next generation of ranking functions. This cycle may repeat until a termination event occurs. At operation 750, the genetic algorithm module 220 identifies one of the potential ranking functions as the solution ranking function.

The ranking module 210 uses the solution ranking function to assign a ranking score to items (e.g., item listings). In some embodiments the ranking module 210 ranks all active items and continually updates them to make sure they are up to date. In other embodiments however, like the one shown in FIG. 7, the ranking module 210 ranks items in the query result. For example, at operation 765, a query processing module 130 receives a query from a client and processes the query to obtain a query result comprising multiple items (operation 770). The ranking module assigns a ranking score to items in the query result at operation 775.

Once the ranking module 210 has assigned ranking scores to the items in the query result, the query processing module 130 may order the items based on their ranking scores. The query result presentation module 135 may then generate an interface to enable the query results to be displayed at a client machine and transmit the ordered query result at operation 780. For example, the query presentation module 135 may transmit the ordered query results to the client computer system that submitted the search query in a format that may be used to display the query results in a web page or other application.

Figure 8:
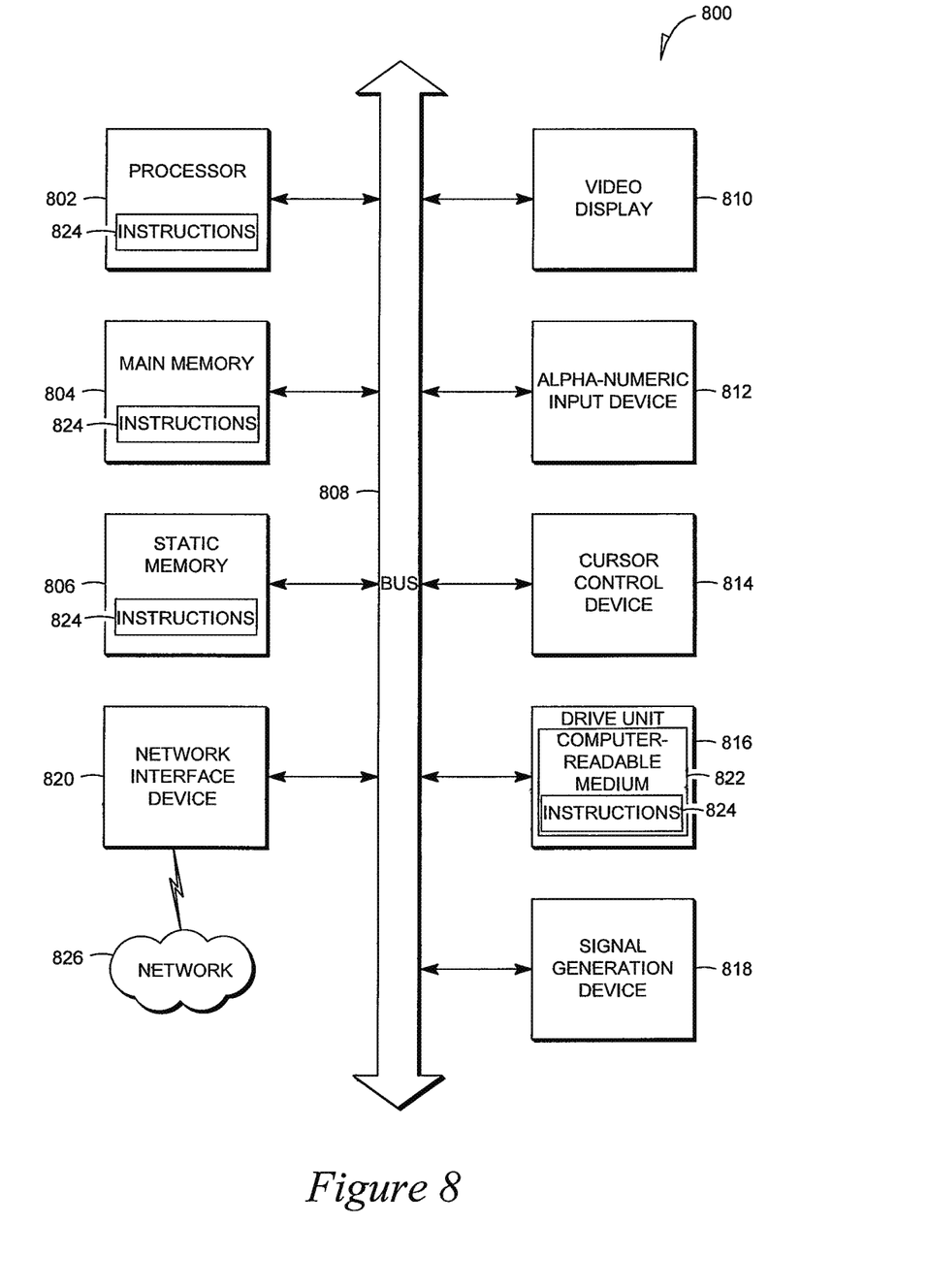
FIG. 8 is a diagrammatic representation of a machine in the example form of a computer system, according to various embodiments.

FIG. 8 is a diagrammatic representation of a machine in the example form of a computer system 800 according to various embodiments within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU) a graphics processing unit (GPU) or both), a main memory 804 and a static memory 806, which communicate with each other via a bus 808. The computer system 800 may further include a video display unit 810 (e.g., a liquid crystal display (LCD) or a cathode ray tube (CRT)). The computer system 800 also includes an alphanumeric input device 812 (e.g., a keyboard), a cursor control device 814 (e.g., a mouse), a disk drive unit 816, a signal generation device 818 (e.g., a speaker) and a network interface device 820.

The disk drive unit 816 includes a machine-readable medium 822 on which is stored one or more sets of instructions (e.g., software 824) embodying any one or more of the methodologies or functions described herein. The software 824 may also reside, completely or at least partially, within the main memory 804 and/or within the processor 802 during execution thereof by the computer system 800, the main memory 804 and the processor 802 also constituting machine-readable media.

The software 824 may further be transmitted or received over a network 826 via the network interface device 820.

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any non-transitory medium that is capable of storing, encoding or carrying a set of instructions for execution by the machine and that cause the machine to perform any one or more of the methodologies of the present invention. The term "machine-readable medium" shall accordingly be taken to include, but not be limited to, storage mediums such as solid-state memories, optical media, and magnetic media.

Thus, a method and system for generating a search result ranking function, processing a search, and presenting search results are described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
generating, by a computer comprising one or more processors, a first set of potential ranking functions corresponding to a plurality of test items;
determining, based on applying the first set of potential ranking functions to the plurality of test items, a respective ordering of the plurality of test items corresponding to each potential ranking function of the first set of potential ranking functions;
comparing each respective ordering of the plurality of test items with an ordering solution, the ordering solution representing a preferred ordering of the plurality of test items;
in response to determining, based on the comparing, that one or more potential ranking functions from the first set of potential ranking functions fail to satisfy a performance characteristic, modifying the one or more potential ranking functions;
identifying a solution ranking function from a second set of potential ranking functions that includes the modified one or more potential ranking functions;
receiving a search query from a client machine;
processing the search query to obtain a query result, the query result including a second plurality of items that are active and are responsive to the search query;

assigning ranking scores to items in the query result based on applying the solution ranking function to the second plurality of items after receiving the search query from the client machine; and transmitting, to the client machine based on receiving the search query from the client machine, the query results in an order based on the ranking scores of the items from the query result.

2. The method of claim 1, wherein the generating the first set of potential ranking functions is performed according to an iterative function generation process, and wherein the applying the first set of potential ranking functions to the plurality of test items is performed in response to determining that the iterative function generation process fails to satisfy one or more metrics.

3. The method of claim 2, wherein the one or more metrics is selected from a group consisting of:

a predetermined number of cycles of the iterative function generation process, an amount of elapsed time, and one or more performance levels of one or more potential ranking functions from the first set of potential ranking functions.

4. The method of claim 2, further comprising:

subsequent to the applying the first set of potential ranking functions to the plurality of test items, determining that the iterative function generation process satisfies the one or more metrics, wherein the identifying the solution ranking function is performed in response to the determining that the iterative function generation process satisfies the one or more metrics.

5. The method of claim 1, wherein the second set of potential ranking functions includes one or more potential ranking functions from the first set of potential ranking functions that satisfy the performance characteristic.

6. The method of claim 5, wherein the identifying the solution ranking function further comprises:

determining a particular ordering of the plurality of test items based on applying the solution ranking function to the plurality of test items; and determining that a similarity between the particular ordering of the plurality of test items and the ordering solution satisfies a similarity threshold.

7. The method of claim 1, further comprising:

storing associations between the assigned ranking scores and the second plurality of items in a database.

8. The method of claim 1, wherein the second plurality of items correspond to active listings of items for sale on a website.

9. A system, comprising:

one or more processors; and a memory storing computer-executable instructions, that in response to execution by the one or more processors, causes the system to perform operations comprising:

generating a first set of potential ranking functions corresponding to a plurality of test items;

determining, based on applying the first set of potential ranking functions to the plurality of test items, a respective ordering of the plurality of test items corresponding to each potential ranking function of the first set of potential ranking functions;

comparing each respective ordering of the plurality of test items with an ordering solution, the ordering solution representing a preferred ordering of the plurality of test items;

in response to determining, based on the comparing, that one or more potential ranking functions from the first set of potential ranking functions fail to satisfy a performance characteristic, modifying the one or more potential ranking functions;

identifying a solution ranking function from a second set of potential ranking functions that includes the modified one or more potential ranking functions;

receiving a search query from a client machine;

processing the search query to obtain a query result, the query result including a second plurality of items that are active and are responsive to the search query after receiving the search query from the client machine;

assigning ranking scores to items in the query result based on applying the solution ranking function to the second plurality of items; and transmitting, to the client machine based on receiving the search query from the client machine, the query results in an order based on the ranking scores of the items from the query result.

10. The system of claim 9, wherein the applying the first set of potential ranking functions includes applying a first potential ranking function to the plurality of test items by calculating, based on a plurality of factors, a ranking score corresponding each item of the plurality of test items, the plurality of factors being associated with a first set of weights.

11. The system of claim 10, wherein the applying the first set of potential ranking functions includes applying a second potential ranking function to the plurality of test items by calculating, based on the plurality of factors, a second ranking score corresponding each item of the plurality of test items, the plurality of factors being associated with a second set of weights that are different than the first set of weights.

12. The system of claim 10, wherein the plurality of factors are selected from a group consisting of an age of each listing for each item of the plurality of test items, a listing quality for each listing, and a seller score for each listing.

13. The system of claim 9, the applying the first set of potential ranking functions includes applying a first potential ranking function to the plurality of test items using a first set of factors and applying a second potential ranking function to the plurality of test items using a second set of factors that are different than the first set of factors.

14. The system of claim 9, wherein the modifying the one or more potential ranking functions comprises:

generating a new potential ranking function based on combining a portion of a first potential ranking function of the one or more potential ranking functions with a portion of a second potential ranking function of the one or more potential ranking functions.

15. The system of claim 9, wherein a first potential ranking function of the one or more potential ranking functions is based on a plurality of factors, and wherein the modifying the one or more potential ranking functions comprises:

adjusting one or more weights associated with the plurality of factors.

16. A non-transitory computer readable medium storing computer-executable instructions, that in response to execution by a system comprising one or more hardware processors, cause the system to perform operations comprising:

generating a first generation of potential ranking functions corresponding to a plurality of test items;

evaluating each potential ranking function of the first generation of potential ranking functions for one or more performance characteristics;

based on the evaluating, selecting potential ranking functions of the first generation of potential ranking functions for modification;

generating additional generations of potential ranking functions by modifying the selected potential ranking functions until one or more generation metrics have been satisfied;

receiving a search query from a client machine;

processing the search query to obtain a query result, the query result including a second plurality of items that are active and are responsive to the search query;

assigning ranking scores to items in the query result based on applying a first potential ranking function to the second plurality of items, the first potential ranking function being selected from a most recent generation of the additional generations after receiving the search query from the client machine; and transmitting, to the client machine based on receiving the search query from the client machine, the query results in an order based on the ranking scores of the items from the query result.

17. The non-transitory computer readable medium of claim 16, wherein the evaluating each potential ranking function of the first generation of potential ranking functions comprises:

determining one or more orderings of the plurality of test items based on applying each potential ranking function to the plurality of test items; and comparing each respective ordering of the plurality of test items with an ordering solution, the ordering solution representing a preferred ordering of the plurality of test items.

18. The non-transitory computer readable medium of claim 17, wherein the evaluating each potential ranking function of the first generation of potential ranking functions comprises:

determining whether a similarity between each respective ordering and the ordering solution satisfies a similarity threshold.

19. The non-transitory computer readable medium of claim 17, wherein the one or more generation metrics are selected from a group consist of:

a threshold number of potential ranking functions of a particular generation of the additional generations satisfying the one or more performance characteristics, a predetermined number of generations, and an amount of elapsed time.

* * * * *